United States Patent
Lee

(10) Patent No.: US 12,085,981 B2
(45) Date of Patent: Sep. 10, 2024

(54) DISPLAY DEVICE AND OPERATION METHOD THEREOF

(71) Applicant: LG ELECTRONICS INC., Seoul (KR)

(72) Inventor: Sungyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/928,102

(22) PCT Filed: May 28, 2020

(86) PCT No.: PCT/KR2020/006879
§ 371 (c)(1),
(2) Date: Nov. 28, 2022

(87) PCT Pub. No.: WO2021/241777
PCT Pub. Date: Dec. 2, 2021

(65) Prior Publication Data
US 2023/0213963 A1 Jul. 6, 2023

(51) Int. Cl.
*G06F 1/16* (2006.01)
*F16M 11/06* (2006.01)
*F16M 11/18* (2006.01)

(52) U.S. Cl.
CPC ........... *G06F 1/1601* (2013.01); *F16M 11/06* (2013.01); *F16M 11/18* (2013.01)

(58) Field of Classification Search
CPC ...... G06F 1/1601; F16M 11/06; F16M 11/18; F16M 11/10; F16M 11/105
See application file for complete search history.

(56) References Cited

U.S. PATENT DOCUMENTS 11,463,649 B2 * 10/2022 Yu .......................... H04N 7/0122
2004/0238233 A1 12/2004 Petrucelli
(Continued)

FOREIGN PATENT DOCUMENTS

EP 1754956 A2 * 2/2007 ............... G01D 5/04
KR 1019950015325 6/1995
(Continued)

OTHER PUBLICATIONS

FlipFrame "A Rotating Digital Picture Frame" by Timothy Giles on hackaday.io project dated Nov. 15, 2016 by archive.org, https://hackaday.io/project/16291-flipframe, embedded youtube video in p. 1 weblink: https://www.youtube.com/watch?v=VA_kyvEj8nw (Year: 2016).*
Raspberry Pi 3 Model B+ Board sold on amazon.com, first available date: Mar. 2, 2019, weblink: https://www.amazon.com/ELEMENT-Element14-Raspberry-Pi-Motherboard/dp/B07P4LSDYV/ref=sr_1_4?keywords=raspberry+pi+3&qid=1702303794&sr=8-4 (Year: 2019).*
(Continued)

*Primary Examiner* — Terrell L McKinnon
*Assistant Examiner* — Ding Y Tan
(74) *Attorney, Agent, or Firm* — LEE, HONG, DEGERMAN, KANG & WAIMEY

(57) ABSTRACT

Disclosed is a display device including a motor, a driving gear rotated by the motor, a rotating gear engaged with the driving gear to rotate around a rotation axis and including a plurality of holes, a display connected to the rotating gear to rotate around the rotation axis, a rotation sensor configured to output a signal indicating whether a hole included in the rotating gear is detected, and a processor configured to control the motor to change a rotation speed of the display based on the signal output by the rotation sensor.

10 Claims, 13 Drawing Sheets

(56) References Cited

U.S. PATENT DOCUMENTS

| | | | | |
|---|---|---|---|---|
| 2008/0055835 A1* | 3/2008 | Kumano | ............... | G06F 1/1601 |
| | | | | 361/679.07 |
| 2018/0060015 A1* | 3/2018 | Park | ......................... | G09G 5/02 |
| 2020/0053891 A1* | 2/2020 | Kim | ....................... | F16M 11/22 |
| 2020/0301469 A1* | 9/2020 | Choi | ....................... | G06F 3/147 |
| 2021/0293371 A1* | 9/2021 | Choi | .................... | F16M 11/105 |

FOREIGN PATENT DOCUMENTS

| | | | |
|---|---|---|---|
| KR | 19980022082 U | * | 7/1998 |
| KR | 200250276 | | 11/2001 |
| KR | 1020090035093 | | 4/2009 |
| KR | 1020190053712 | | 5/2019 |

OTHER PUBLICATIONS

Jason Wolin motorized sit or stand, landscape or portrait monitor youtube video, dated: Oct. 12, 2017, https://www.youtube.com/watch?v=tU-f4npZydw (Year: 2017).*

Al Williams online post: Couch Potato Refined_ Self-Rotating TV Uses Plywood Gears on Hackaday, dated: Jul. 26, 2018, https://hackaday.com/2018/07/26/couch-potato-refined-self-rotating-tv-uses-plywood-gears/ (Year: 2018).*

Ultimate Monitor Stand dated by web.archive.org: Jul. 16, 2018 https://www.makingstuff.info/Projects/Ultimate_Monitor_Stand (Year: 2018).*

PCT International Application No. PCT/KR2020/006879, International Search Report dated Feb. 22, 2021, 4 pages.

* cited by examiner (a)

(b)

(a)

(b)

DISPLAY DEVICE AND OPERATION METHOD THEREOF

CROSS-REFERENCE TO RELATED APPLICATIONS

This application is the National Stage filing under 35 U.S.C. 371 of International Application No. PCT/KR2020/006879, filed on May 28, 2020, the contents of which are all incorporated by reference herein in their entirety.

TECHNICAL FIELD

The present disclosure relates to a display device and an operating method thereof, and more particularly to a display device for performing a rotation operation of a display and an operation method of the display device.

BACKGROUND ART

A display device is a device with a function of receiving, processing, and displaying an image that a user is capable of watching. The display device receives, for example, a broadcast signal selected by the user among broadcast signals transmitted from a broadcast station, separates an image signal from the received signal, and displays the separated video signal on the display again.

Recently, in a viewing method of a display device, various attempts have been made that deviate from the conventional method, such as viewing with the display device in a vertical position.

Rotation of the display is required to view the display device vertically. Rotation of the display may be performed manually by the user directly applying force, but may also be performed automatically by a rotation module such as a motor and rotating gear.

If rotation of the display is performed by the rotation module, when control of the rotation module is not performed stably, the rotation module may be damaged, and the display may also be damaged.

DISCLOSURE

Technical Problem

An object of the present disclosure is to provide a display device for natural rotation during rotation of a display and an operation method of the display device.

An object of the present disclosure is to provide a display device for implementing a rotation module for performing rotation of a display with a simple structure and an operation method of the display device.

Technical Solution

According to an embodiment of the present disclosure, a display device includes a motor, a driving gear rotated by the motor, a rotating gear engaged with the driving gear to rotate around a rotation axis and including a plurality of holes, a display connected to the rotating gear to rotate around the rotation axis, a rotation sensor configured to output a signal indicating whether a hole included in the rotating gear is detected, and a processor configured to control the motor to change a rotation speed of the display based on the signal output by the rotation sensor.

The rotation sensor according to an embodiment of the present disclosure may include a light sensor.

The plurality of holes included in the rotating gear may include a plurality of first holes spaced apart from each other by a first distance in a rotation direction of the rotating gear, and a plurality of second holes located after the plurality of first hole with respect to a rotation direction of the rotating gear and spaced apart from each other by a second distance different from the first distance.

The rotation sensor may output a low signal indicating that the hole is detected, and the processor may determine whether an output period of the low signal is changed.

When the output period of the low signal is changed, the processor may control the motor to change the rotation speed of the display.

The processor may control the motor to change the rotation speed of the display in response to the output period of the low signal.

The display device according to an embodiment of the present disclosure may further include a memory configured to store correspondence between the output period of the low signal and the display.

The processor may recognize whether rotation of the display is disturbed based on the signal output from the rotation sensor, and may control the motor to stop rotation when recognizing that rotation of the display is disturbed.

The processor may determine a rotation direction of the motor according to whether an input signal for starting rotation of the display is an input signal for changing an arrangement mode of the display to a landscape mode or an input signal for changing the arrangement mode to a portrait mode.

An arrangement mode of the display may be changed to a landscape mode or a portrait mode according to a rotation direction of the driving gear.

Advantageous Effects

According to the present disclosure, it may be advantageous that accuracy in controlling the rotation speed of the display is increased, and the stability of the product is ensured.

According to the present disclosure, it may be advantageous that a rotation operation of the display is detected and simultaneously a rotation speed of the display is controlled through a simple structure.

BEST MODE

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

Figure 1:
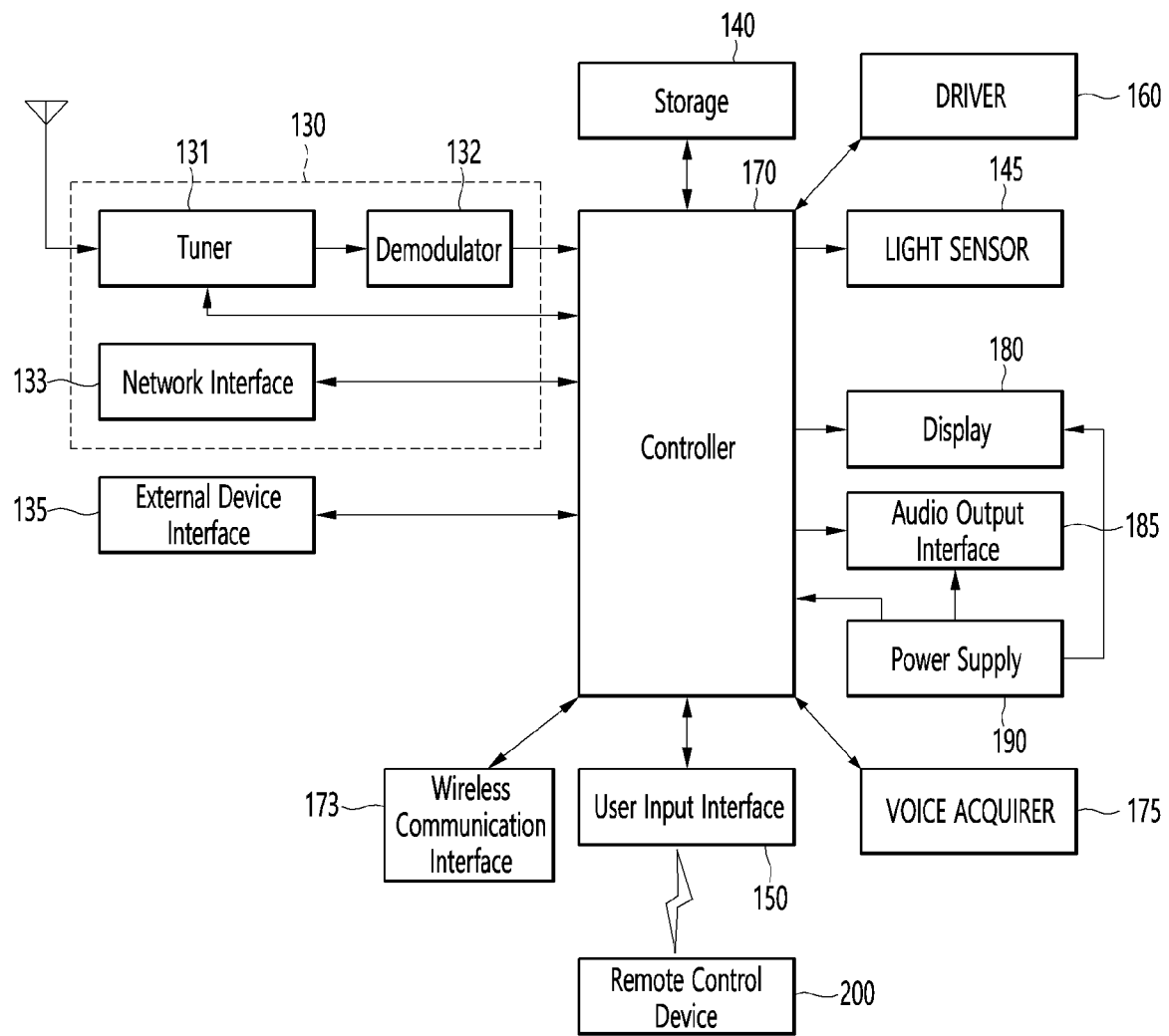
FIG. 1 is a block diagram showing a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a storage 140, a sensing part 145, a user input interface 150, a controller 170, a wireless communication interface 173, a voice acquirer 175, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The network interface 133 may provide an interface for connecting the display device 100 to a wired/wireless network including an Internet network. The network interface 133 may transmit or receive data to or from other users or other electronic devices through a connected network or another network linked to the connected network.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The external device interface 135 may receive an application or a list of applications in an external device adjacent thereto, and transmit the same to the controller 170 or the storage 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

In addition, a part of content data stored in the display device 100 may be transmitted to a selected user among a selected user or a selected electronic device among other users or other electronic devices registered in advance in the display device 100.

The storage 140 may store programs for signal processing and control of the controller 170, and may store images, audio, or data signals, which have been subjected to signal-processed.

In addition, the storage 140 may perform a function for temporarily storing images, audio, or data signals input from an external device interface 135 or the network interface 133, and store information on a predetermined image through a channel storage function.

The storage 140 may store an application or a list of applications input from the external device interface 135 or the network interface 133.

The storage 140 may store information of an output period or the like of a low signal output by the light sensor 145 according to an output period of a low signal output by the light sensor 145, a gear ratio and sizes of a driving gear 165 and a rotating gear 168, and the like in response to the output period of the low signal output by the light sensor 145 and a rotation speed of a driver 160.

The memory 140 may be referred to as a memory 140.

The display device 100 may play back a content file (a moving image file, a still image file, a music file, a document file, an application file, or the like) stored in the memory 140 and provide the same to the user.

The sensing part 145 may include a sensor for detecting a change inside the display device 100 or outside the display device 100.

The sensing part 145 may be referred to as the rotation sensor 145 for detecting rotation of the display 180 or the light sensor 145, which will be described below.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The driver 160 may rotate the driving gear (refer to FIG. 8) according to a driving signal of the controller 170. The driver 160 may include a motor.

The audio signal processed by the controller 170 may be output to the speaker 185. Also, the audio signal processed by the controller 170 may be input to the external output device through the external device interface 135.

In addition, the controller 170 may control the overall operation of the display device 100. The controller 170 may be referred to as the processor 170.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100. Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The voice acquirer 175 may acquire audio. The voice acquirer 175 may include at least one microphone (not shown), and may acquire audio around the display device 100 through the microphone (not shown).

The display 180 may convert image signals, data signals, and OSD signals processed by the controller 170, or image signals or data signals received from the external device interface 135 into R, G, and B signals, and generate drive signals.

The display 180 may be referred to as a display 180.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the audio output part 185.

The audio output part 185 may receive the audio-processed signal from the controller 170 and may output the signal as audio.

The power supply circuit 190 may supply the corresponding power throughout the display device 100. In particular, power may be supplied to the controller 170 implemented in the form of a system on chip (SOC), the display 180 for displaying an image, and the audio output part 185 for outputting an audio.

In particular, the power supply circuit 190 may include a converter for converting AC power into DC power, and a dc/dc converter for converting a level of DC power.

Next, a remote control device according to an embodiment of the present disclosure will be described with reference to FIGS. 2 to 3.

Figure 2:
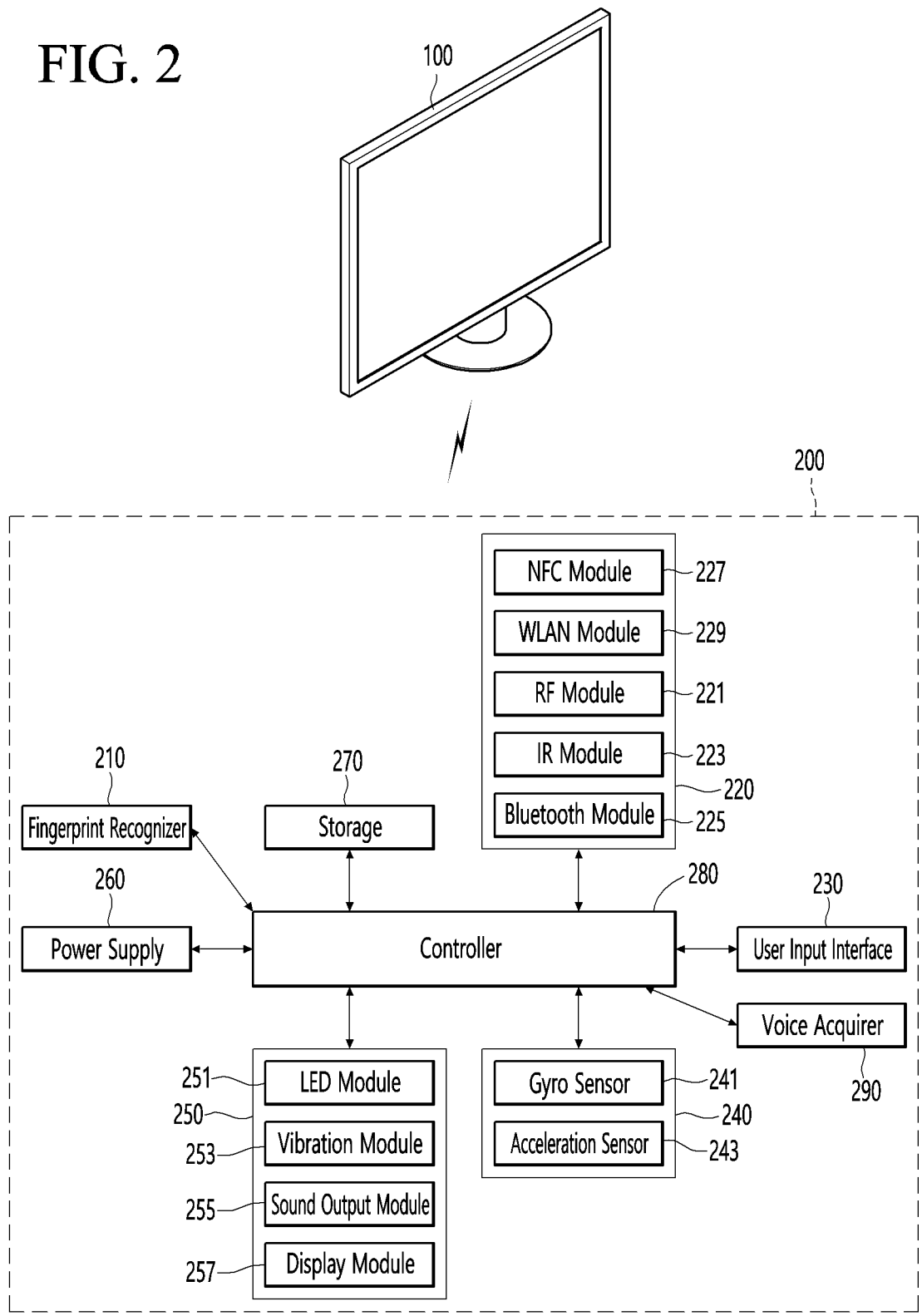
FIG. 2 is a block diagram of a remote control device according to an embodiment of the present disclosure.
Figure 3:
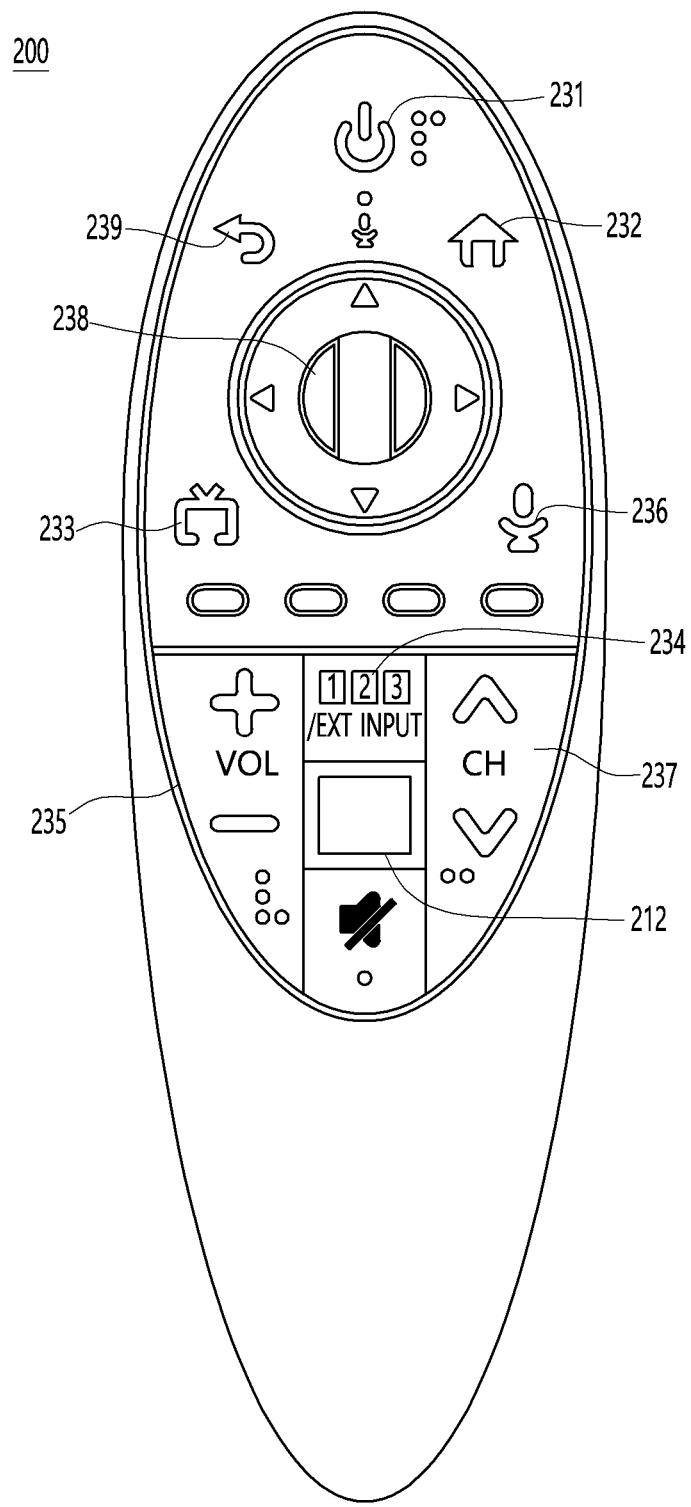
FIG. 3 shows an actual configuration example of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a voice acquirer 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation. The power button 231 may be a button for turning on/off the power of the display device 100. The home button 232 may be a button for moving to the home screen of the display device 100. The live button 233 may be a button for displaying a real-time broadcast program. The external input button 234 may be a button for receiving an external input connected to the display device 100. The volume control button 235 may be a button for adjusting the level of the volume output by the display device 100. The voice recognition button 236 may be a button for receiving a user's voice and recognizing the received voice. The channel change button 237 may be a button for receiving a broadcast signal of a specific broadcast channel. The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100. The user may recognize whether the user input interface 230 is operated or whether the display device 100 is controlled through the output interface 250.

For example, the output interface 250 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication part 220.

In addition, the power supply circuit 260 may supply power to the remote control device 200, and stop power supply when the remote control device 200 has not moved for a predetermined time to reduce power consumption. The power supply circuit 260 may restart power supply when a predetermined key provided in the remote control device 200 is operated.

The memory 270 may store various types of programs and application data required for control or operation of the remote control device 200. When the remote control device 200 transmits and receives signals wirelessly through the display device 100 and the RF circuit 221, the remote control device 200 and the display device 100 transmit and receive signals through a predetermined frequency ban.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication part 220.

Also, the voice acquirer 290 of the remote control device 200 may obtain a speech.

The voice acquirer 290 may include at least one microphone 291 and may acquire voice through the microphone 291.

Next, a description will be given referring to FIG. 4.

Figure 4:
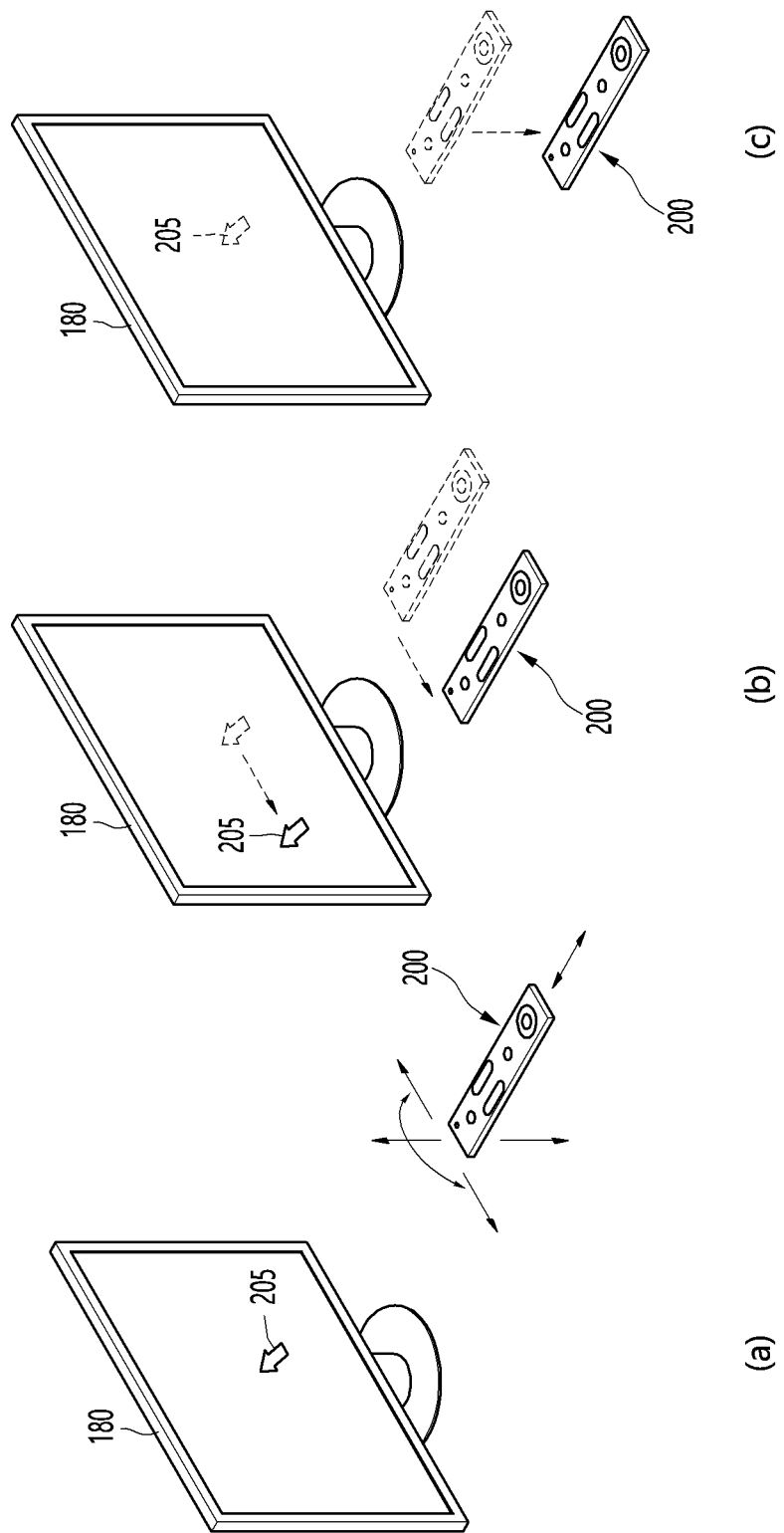
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

The display 180 of the display device 100 according to an embodiment of the present disclosure may rotate from horizontal to vertical or from vertical to horizontal.

An arrangement mode of the display 180 may include a landscape mode, a portrait mode, and a rotation mode.

Figure 5:
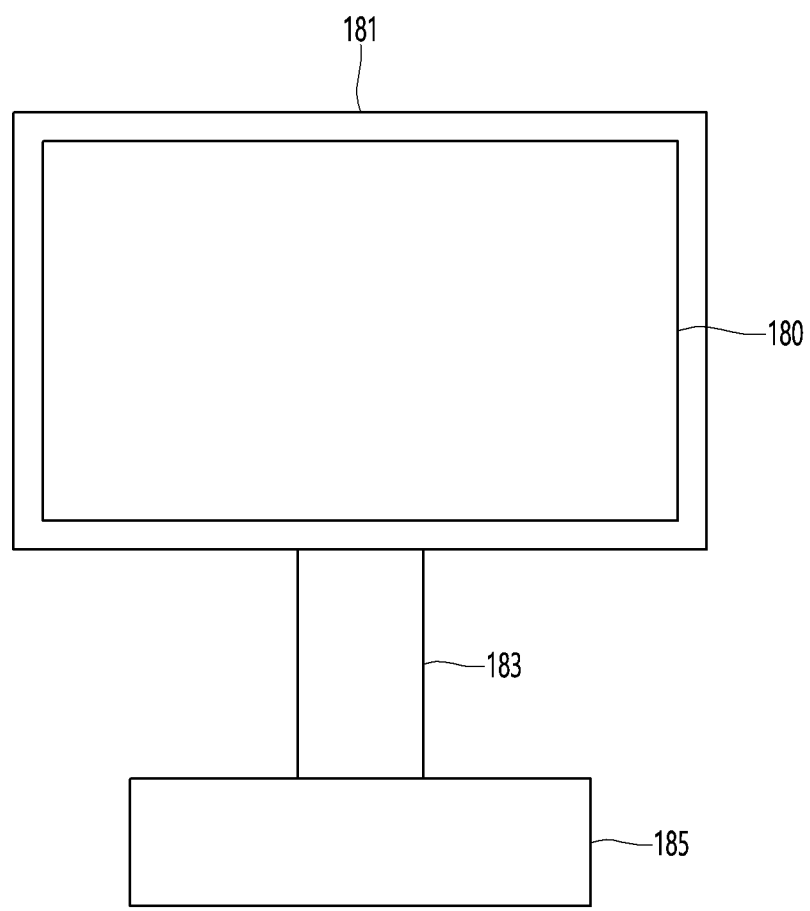
FIG. 5 is an exemplary diagram illustrating a state when the display device of the present disclosure is in a landscape mode.
Figure 6:
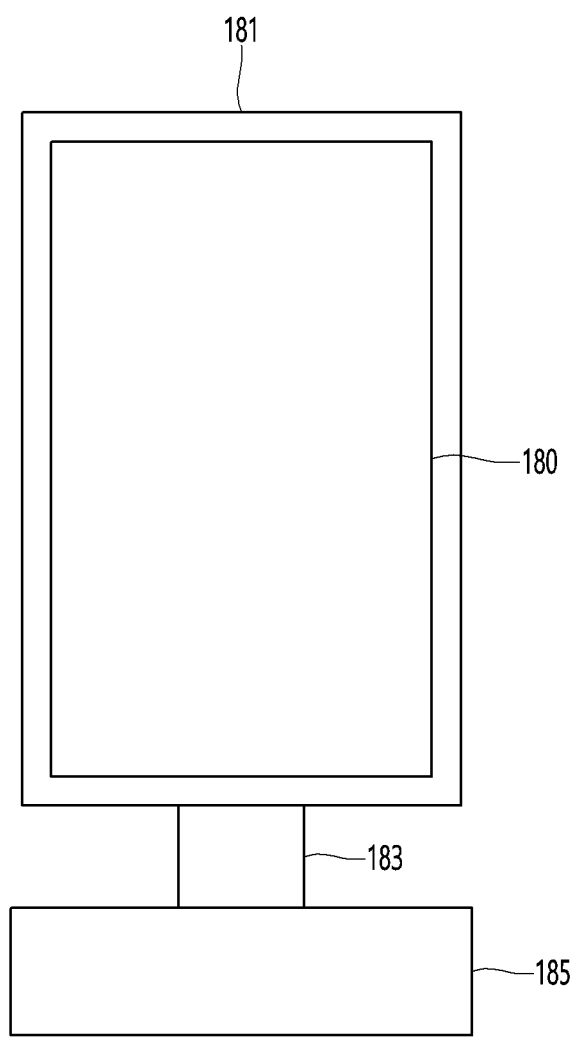
FIG. 6 is an exemplary diagram illustrating a state in which the display device of the present disclosure is in a portrait mode.

FIG. 5 is an exemplary diagram illustrating a state when the display device of the present disclosure is in a landscape mode, and FIG. 6 is an exemplary diagram illustrating a state in which the display device of the present disclosure is in a portrait mode.

The landscape mode of the display 180 may be a mode in which a long side of the display 180 is in a horizontal direction and a short side is in a vertical direction as shown in FIG. 5.

The portrait mode of the display 180 may be a mode in which a short side of the display 180 is in a horizontal direction and a long side is in a vertical direction as shown in FIG. 6.

The rotation mode of the display 180 may be a mode in which an arrangement mode of the display 180 is between the landscape mode and the portrait mode.

An output screen mode of the display 180 may include a horizontal screen mode for outputting an image under the landscape mode, a vertical screen mode for outputting an image under the portrait mode, and a rotation screen mode for outputting an image under the rotation mode.

The display device 100 may include the display 180, a housing 181 to which the display 180 is attached, a base 185 placed on the floor, and a stand 183 for connecting the housing 181 and the base 185.

In the drawing, the display 180 and the housing 181 to which the display 180 is attached are shown separately, but the display 180 and the housing 181 may be combined to be referred to as the display 180. Therefore, in the present specification, for convenience of description, rotation of the display 180 may be referred to as rotation of the housing 181.

In addition, in the drawing, the stand 183 and the base 185 connected to one end of the stand 183 and placed on the floor are shown separately, but the stand 183 and the base 185 may be combined and provided in the form of a single stand, which may not limit the scope of the present disclosure.

Hereinafter, a rotation method of the display 180 of the display device 100 according to the present disclosure will be described with reference to FIGS. 7 and 8.

Figure 7:
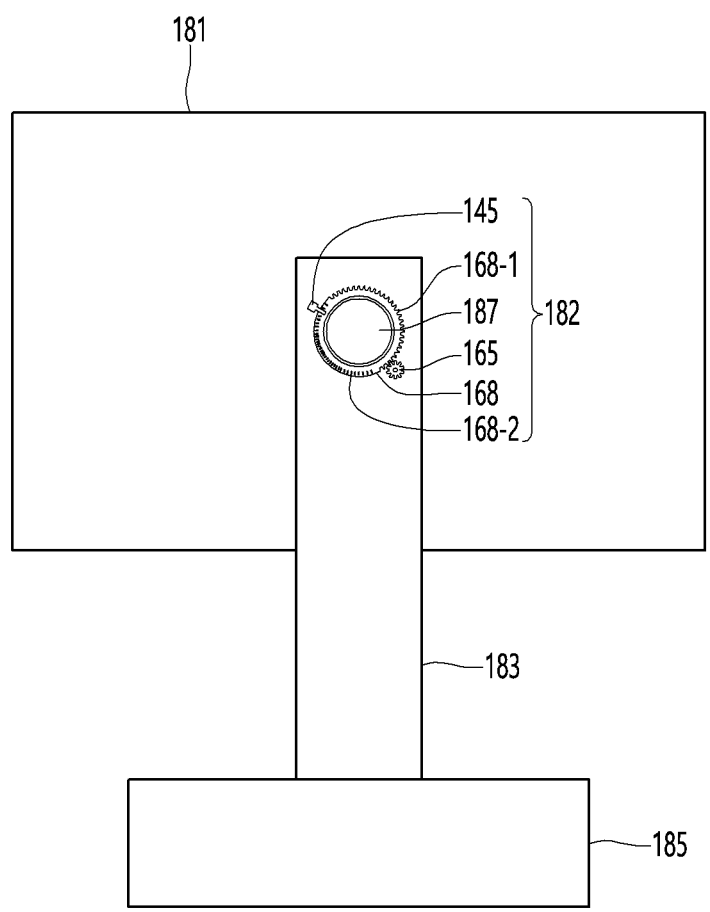
FIG. 7 is a view of the display device of the present disclosure from the back.
Figure 8:
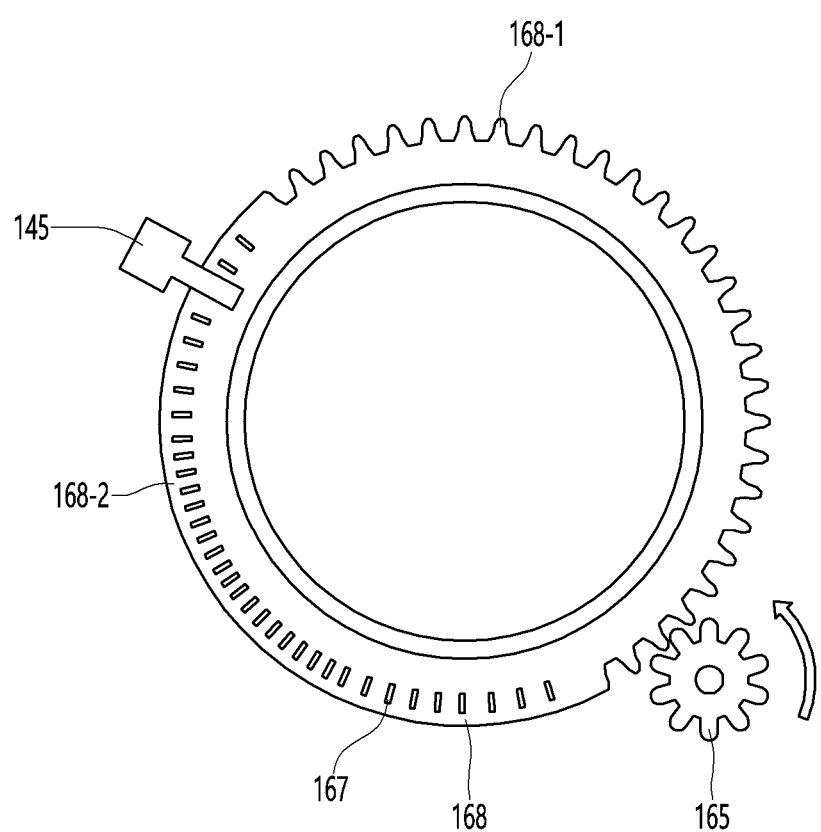
FIG. 8 is an enlarged view of a rotating part to explain the rotation method of the display of the present disclosure.

FIG. 7 is a view of the display device of the present disclosure from the back, and FIG. 8 is an enlarged view of a rotating part to explain the rotation method of the display of the present disclosure.

One end of the stand 183 may be connected to the base 185, and the other end may be connected to the housing 181 through a rotation axis 187.

One end of the stand 183 may be provided with a rotating part 182.

Referring to FIG. 8, the rotating part 182 may include the rotation axis 187 connected to the housing 181 to rotate the housing 181, the driving gear 165 rotated by the driver 160, and the rotating gear 168 engaged with the driving gear 165 and rotating around the rotation axis 187.

A saw tooth part 168-1 for receiving rotational power from the driving gear 165 may be formed in a predetermined area of the rotating gear 168, and a hole part 168-2 located between the rotation sensors 145 to generate a rotation detection signal may be formed in the remaining area.

First, a method of rotating the display 180 by the controller 170 will be described with respect to the saw tooth part 168-1 of the rotating gear 168 and the driving gear 165.

The driving gear 165 may rotate using rotational power of the driver 160 including a motor. The driving gear 165 may rotate in a first direction (e.g., counter clockwise) based on a drive shaft and may rotate in a second direction (e.g., clockwise) opposite to the first direction.

When the driving gear 165 rotates around the drive shaft in the first direction around, the rotating gear 168 engaged with the driving gear 165 through the saw tooth part 168-1 may rotate around the rotation axis 187 in the second direction opposite to the first direction.

The rotating gear 168 may transfer rotational power to the rotation axis 187. Accordingly, the housing 181 connected to the rotation axis 187 may rotate around the rotation axis 187 in the second direction.

In contrast, when the driving gear 165 rotates around the drive shaft in the second direction opposite to the first direction, the rotating gear 168 engaged with the driving gear 165 may rotate around the rotation axis 187 in the first direction opposite to the second direction. Accordingly, the housing 181 connected to the rotation axis 187 may rotate around the rotation axis 187 in the first direction.

Accordingly, the housing 181 may rotate clockwise or counter clockwise by rotation of the driver 160.

Through the above-described embodiment, the display device 100 of the present disclosure may rotate the housing 181, that is, the display 180 according to a control signal of the controller 170.

Accordingly, when a user wants to watch an image in a portrait mode as shown in FIG. 6 while watching the image on the display device 100 in a landscape mode as shown in FIG. 5, the current mode may be changed to the portrait mode through rotation of the display 180. In contrast, the user may change the display device 100 to the landscape mode shown in FIG. 5 to the portrait mode shown in FIG. 6.

Hereinafter, with reference to FIGS. 9 to 10, a method of detecting rotation by the rotation sensor 145 according to an embodiment of the present disclosure will be described in terms of a hole part 168-2 of the rotating gear 168.

The hole part 168-2 of the rotating gear 168 may include a plurality of holes 167. The hole 167 may refer to a hole formed in the rotating gear 168. The plurality of holes 167 may be formed at a constant distance, but this will be described in detail with reference to FIG. 12.

Figure 9:
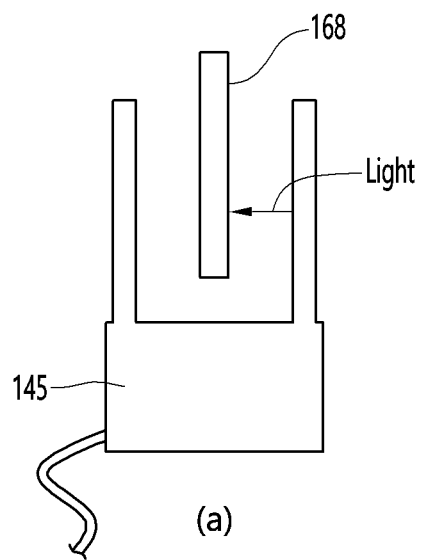
FIGS. 9 and 10 are exemplary diagrams for explaining an operation method of a rotation sensor of a display device according to an embodiment of the present disclosure.
Figure 9:
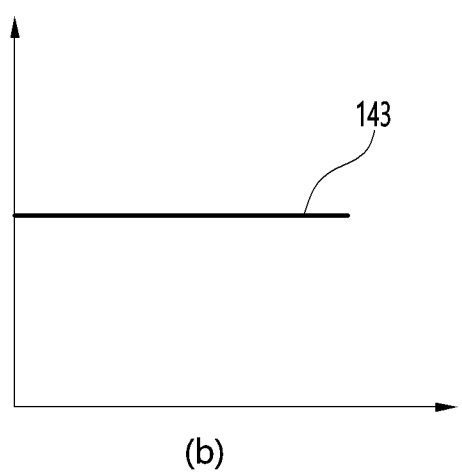
Figure 10:
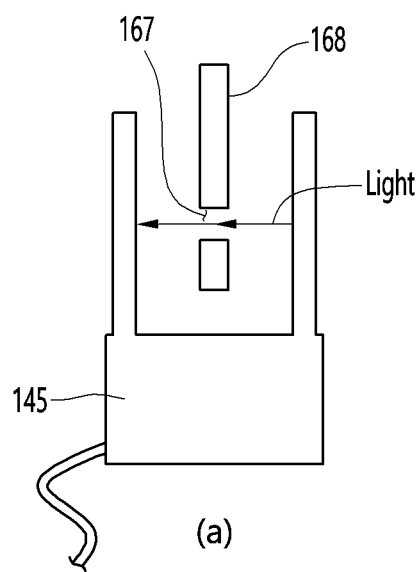
Figure 10:
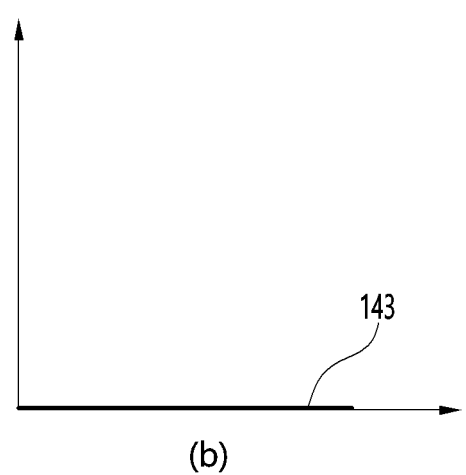

FIGS. 9 and 10 are exemplary diagrams for explaining an operation method of a rotation sensor of a display device according to an embodiment of the present disclosure.

(a) of FIG. 9 and (a) of FIG. 10 are exemplary diagrams of a rotation sensor of a display device according to an embodiment of the present disclosure as viewed from the side, and (b) of FIG. 9 and (b) of FIG. 10 are exemplary diagrams of an output signal of a rotation sensor in the embodiments of (a) of FIG. 9 and (a) of FIG. 10, respectively.

The rotation sensor of the display device 100 according to an embodiment of the present disclosure may include the light sensor 145.

The light sensor 145 may mean a transmissive light sensor or a reflective light sensor, but in the present specification, the light sensor 145 is a transmissive light sensor as an example.

The light sensor 145 may include a light emitter and a light receiver. When light emitted from the light emitter of the light sensor 145 is detected by the light receiver of the light sensor 145, output of the light sensor 145 may be 0 (low). When the light emitted from the light emitter of the light sensor 145 is not detected by the light receiver of the light sensor 145, output of the light sensor 145 may be 1 (high).

A light emitter of the light sensor 145 may be disposed at one side of the rotating gear 168 according to an embodiment of the present disclosure, and a light receiver of the light sensor 145 for detecting light emitted from the light emitter of the light sensor 145 and transmitted through the hole 167 may be disposed at the other side of the rotating gear 168.

Accordingly, when the rotating gear 168 blocks light emitted from the light emitter as shown in (a) of FIG. 9, output of the light sensor 145 may be high as shown in (b) of FIG. 9.

In addition, when the light emitted from the light emitter passes through the hole 167 present in the rotating gear 168 as shown in (a) of FIG. 10 and is detected by the light receiver, output of the light sensor 145 may be low as shown in (b) of FIG. 10.

Accordingly, the display device 100 of the present disclosure may define the hole part 168-2 including a plurality of the holes 167 in the rotating gear 168, and the light sensor 145 may output a signal indicating whether the hole 167 included in the rotating gear 168 is detected.

The display device 100 of the present disclosure may control the driver 160 to change the rotation speed of the display 180 based on a signal output by the light sensor 145, but a detailed control method will be described later.

According to the above-described embodiment, the display device 100 of the present disclosure may have an advantage of sensing the rotation operation of the display 180 and simultaneously controlling the rotation speed of the display 180 through a simple structure.

The present disclosure may slowly accelerate the speed of the driver 160 when rotation of the display 180 starts, may rotate the driver 160 at a high speed during rotation of the display 180, and when rotation is almost complete, the rotation of the display 180 may be completely stopped by slowing down the driver 160 again.

Hereinafter, with reference to FIGS. 11 and 12, a method of detecting a rotation operation of the display 180 through the hole 167 included in the rotating gear 168 and controlling the driver 160 to change the rotation speed of the display 180 in response to the detected rotation operation by the display device 100 according to an embodiment of the present disclosure will be described.

Figure 11:
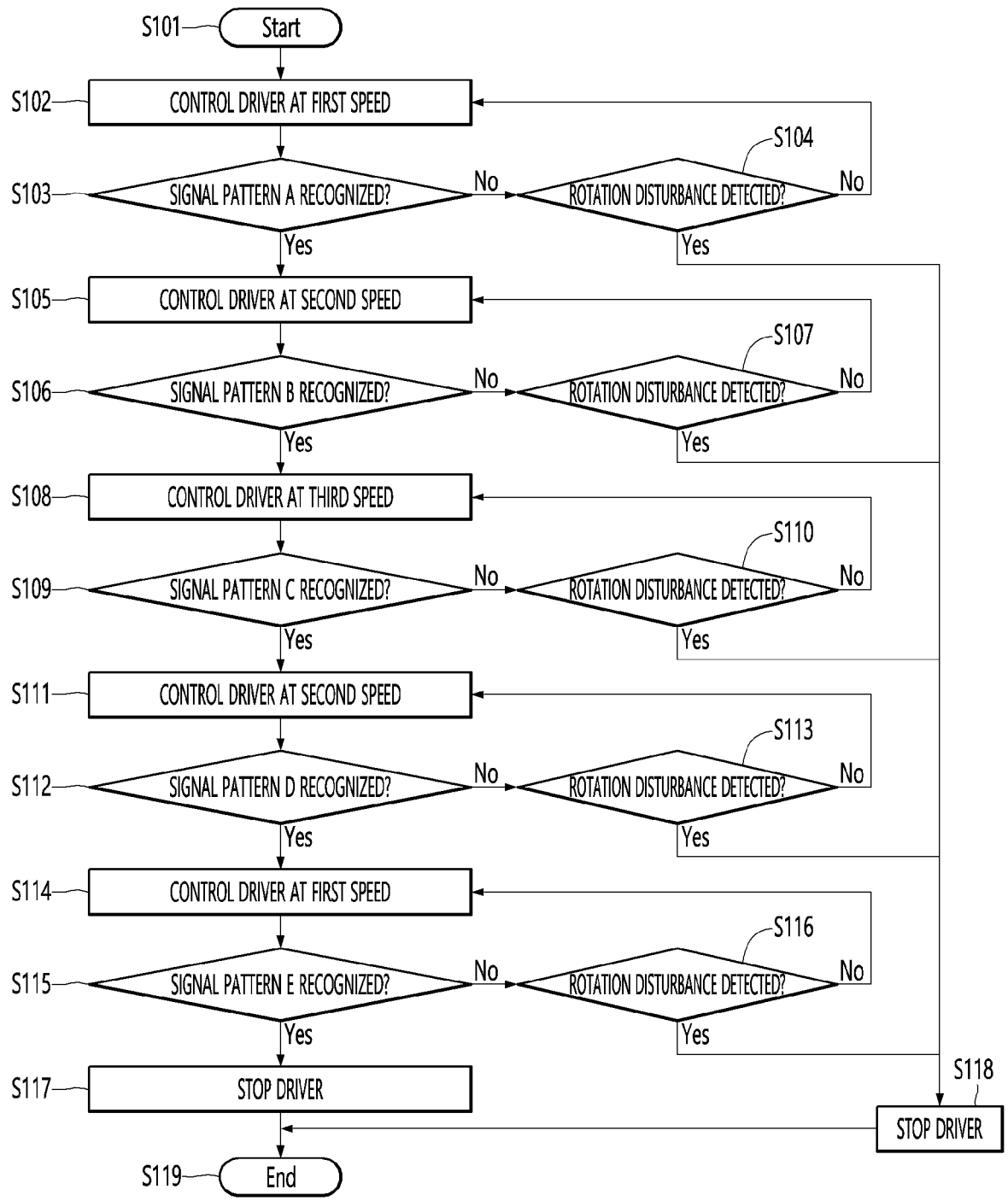
FIG. 11 is a flowchart for explaining a control method for changing a rotation speed based on an output signal of a rotation sensor by a display device according to an embodiment of the present disclosure.

FIG. 11 is a flowchart for explaining a control method for changing a rotation speed based on an output signal of a rotation sensor by a display device according to an embodiment of the present disclosure. FIG. 12 is an exemplary diagram showing a hole part formed in a rotating gear, an output signal output by a rotation sensor by the hole part, and a speed of a driver.

When the controller 170 receives a rotation start signal of the display 180, the controller 170 may start driving the driver 160 (S101). The rotation start signal may be received through the user input interface 150.

The controller 170 may determine a rotation direction of the driver 160 depending on whether an input signal to start rotation of the display 180 is an input signal to change the arrangement mode of the display 180 to a landscape mode or an input signal to change the arrangement mode of the display 180 to a portrait mode.

For example, when the input signal to start rotation of the display 180 is the input signal to change the display 180 to the landscape mode, the controller 170 may determine the rotation direction of the driver 160 to a first direction. In contrast, when the input signal to start rotation of the display 180 is the input signal to change the display 180 to the portrait mode, the controller 170 may determine the rotation direction of the driver 160 to a second direction opposite to the first direction.

When receiving the display rotation input signal, the controller 170 may control the speed of the driver 160 to a first speed (S102). This may refer to an operation corresponding to a section (a) in FIG. 12. The section (a) may refer to a section in which the display starts rotating.

According to an embodiment of the present disclosure, the plurality of holes 167 formed in the rotating gear 168 may include a plurality of first holes 167-1 that are spaced apart from each other by a first distance d1 in the rotation direction of the rotating gear 168.

The plurality of holes 167 formed in the rotating gear 168 may include a plurality of second holes 167-2 that are disposed after the first hole 167-1 in the rotation direction of the rotating gear 168 and spaced apart from each other by a second distance d2 different from the first distance d1.

The first speed may refer to a reference speed for rotating the display 180 at a slow speed to start or stop rotation. For example, the first speed may be 60 RPM, but this is only an example.

A time taken for the rotation sensor 145 to detect the first hole 167-1 and to detect a first hole 167-1 spaced apart from another first hole 167-1 by the first distance d1 while the controller 170 controls the driver 160 at the first speed (i.e., a time taken to output low again from low) may be a first time. For example, the first time may be 160 ms.

Referring back to FIG. 11, when the controller 170 recognizes a signal pattern A through an output signal of the rotation sensor 145 while controlling the driver 160 at the first speed (S103), the controller 170 may control the driver 160 at the second speed higher than the first speed (S105).

Figure 12:
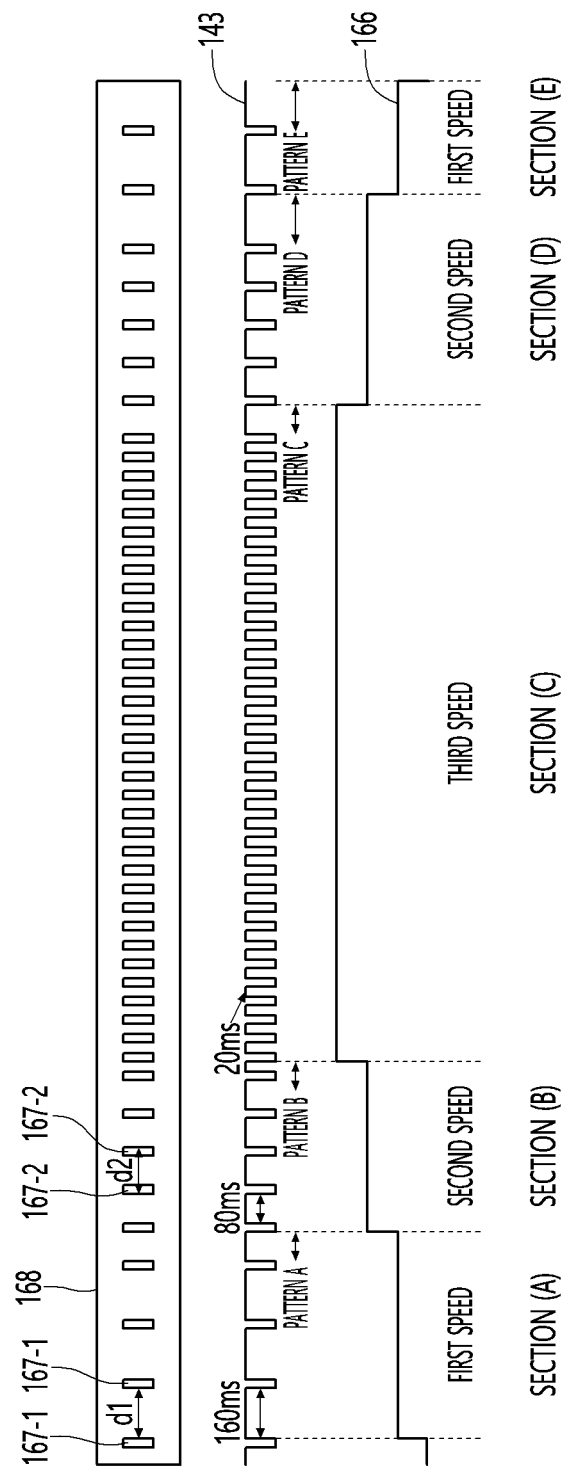
FIG. 12 is an exemplary diagram showing a hole part formed in a rotating gear, an output signal output by a rotation sensor by the hole part, and a speed of a driver.

This may mean an operation of transitioning from the section (a) to the section (b) of FIG. 12.

The signal pattern A may refer to a pattern in which an output signal of the rotation sensor 145 is unevenly output as a separation distance between the plurality of holes 167 formed in the rotating gear 168 is changed as shown in FIG. 12.

For example, the signal pattern A may be a pattern in which the output signal of the rotation sensor 145 is maintained high for a time shorter than the first time (e.g., 160 ms).

That is, the signal pattern A may mean a section in which the output period of the low signal of the rotation sensor 145 is shortened.

When recognizing the signal pattern A, the controller 170 may control the speed of the driver 160 at the second speed higher than the first speed, which may mean a section (b) in FIG. 12.

The second speed may refer to a reference speed for rotating the display 180 at a normal speed in order to prevent an impact on the display 180 when the rotation speed is suddenly controlled from a slow speed to a high speed. For example, the second speed may be 120 RPM, but this is only an example.

A time taken for the rotation sensor 145 to detect the next hole 167 from the hole 167 (i.e., a time taken to output low from low again) while the controller 170 controls the driver 160 at the second speed may be the second time. For example, the second time may be 80 ms.

Referring back to FIG. 11, if the signal pattern A is not recognized, the controller 170 may determine whether rotation disturbance is detected (S104). Detection of rotation disturbance may mean a case in which the signal pattern A is not recognized even though it is time for the signal pattern A to be detected in the output signal of the rotation sensor 145.

If rotation of the display 180 is disturbed by an external force, the output signal of the rotation sensor 145 may be maintained high or low even after rotation starts. In this case, the controller 170 may detect rotation disturbance.

The controller 170 may stop the driver 160 when rotation disturbance is detected (S118).

This is because even if rotation of the display 180 is stopped by an external force, when the driver 160 is driven, the structure may be damaged.

The controller 170 may control the display 180 to indicate that rotation disturbance is detected, and may output the same as a voice through the audio output part 185.

Referring back to FIG. 11, when the controller 170 recognizes a signal pattern B while controlling the driver 160 at the second speed (S106), the controller 170 may control the driver 160 at a third speed higher than the second speed (S108).

This may mean an operation of transitioning from the section (b) to the second (c) of FIG. 12.

The signal pattern B may refer to a pattern in which an output signal of the rotation sensor 145 is unevenly output as a separation distance between the plurality of holes 167 formed in the rotating gear 168 is changed as shown in FIG. 12.

For example, the signal pattern B may be a pattern in which the output signal of the rotation sensor 145 is maintained high for a time shorter than the second time (e.g., 80 ms). In other words, the signal pattern B may mean a pattern in which a time taken for the rotation sensor 145 to detect the next hole 167 from the hole 167 is shorter than the second time.

That is, the signal pattern A may mean a section in which the output period of the low signal of the rotation sensor 145 is shortened.

When recognizing the signal pattern B, the controller 170 may control the speed of the driver 160 at the third speed higher than the second speed, which may mean a section (c) in FIG. 12.

The third speed may mean a reference speed that makes the rotation speed of the display 180 the fastest. According to a previous procedure, when rotation of the display 180 reaches a stable state through acceleration of the rotation speed of the display 180, the controller 170 may control the rotation speed of the display 180 the fastest. For example, the third speed may be 240 RPM, but this is only an example.

A time taken for the rotation sensor 145 to detect the next hole 167 from the hole 167 while the controller 170 controls the driver 160 at the third speed (i.e., a time taken to output low again from low) may be a third time. For example, the third time may be 20 ms.

Referring back to FIG. 11, when the controller 170 does not recognize a signal pattern B, whether rotation disturbance is detected may be determined (S107). Hereinafter, the following operations S107, S110, S113, and S116 may be the same as operation S104, and a repeated description is omitted.

When the controller 170 recognizes a signal pattern C while controlling the driver 160 at the third speed (S109), the controller 170 may control the driver 160 at the second speed lower than the third speed (S111).

This may mean an operation of transitioning from the section (c) to the section (d) of FIG. 12.

As described above, the signal pattern C may refer to a pattern in which an output signal of the rotation sensor 145 is unevenly output as a separation distance between the plurality of the holes 167 formed in the rotating gear 168 is changed as shown in FIG. 12.

For example, the signal pattern C may be a pattern in which the output signal of the rotation sensor 145 is maintained high for a time longer than the third time (e.g., 20 ms). In other words, the signal pattern C may mean a pattern in which a time taken for the rotation sensor 145 to detect the next hole 167 from the hole 167 is longer than the third time.

That is, the signal pattern C may mean a section in which the output period of the low signal of the rotation sensor 145 is ≒ the rotation sensor 145 is lengthened.

When recognizing the signal pattern C, the controller 170 may control the speed of the driver 160 at the second speed lower than the third speed, which may mean a section (d) in FIG. 12.

The second speed may refer to a reference speed that rotates the display 180 at a normal speed in order to prevent an impact on the display 180 when the rotation speed is suddenly controlled from a high speed to a slow speed. For example, the second speed may be 120 RPM, but this is only an example.

A time taken for the rotation sensor 145 to detect the next hole 167 from the hole 167 while the controller 170 controls the driver 160 at the second speed (i.e., a time taken to output low again from low) may be a second time.

Referring back to FIG. 11, when the controller 170 recognizes a signal pattern D while controlling the driver 160 at the second speed (S112), the controller 170 may control the driver 160 at the first speed lower than the second speed (S114).

This may mean an operation of transitioning from the section (d) to the section (e) of FIG. 12.

The signal pattern D may refer to a pattern in which an output signal of the rotation sensor 145 is unevenly output as a separation distance between the plurality of the holes 167 formed in the rotating gear 168 is changed as shown in FIG. 12.

For example, the signal pattern D may be a pattern in which the output signal of the rotation sensor 145 is maintained high for a time longer than the second time. In other words, the signal pattern C may mean a pattern in which a time taken for the rotation sensor 145 to detect the next hole 167 from the hole 167 is longer than the second time.

That is, the signal pattern D may mean a section in which the output period of the low signal of the rotation sensor 145 is ≒ the rotation sensor 145 is lengthened.

When recognizing the signal pattern D, the controller 170 may control the speed of the driver 160 at the first speed lower than the second speed, which may mean a section (e) in FIG. 12.

The first speed may refer to a reference speed that rotates the display 180 at a low speed in order to prevent an impact on the display 180 when the rotation speed is suddenly stopped. For example, the first speed may be 60 RPM, but this is only an example.

A time taken for the rotation sensor 145 to detect the next hole 167 from the hole 167 while the controller 170 controls the driver 160 at the first speed (i.e., a time taken to output low again from low) may be a first time.

Referring back to FIG. 11, when the controller 170 recognizes a signal pattern E while controlling the driver 160 at the first speed (S115), the controller 170 may stop the driver 160 (S117).

The signal pattern E may refer to a pattern in which an output signal of the rotation sensor 145 is maintained high for a longer time than the first time. This may mean rotation of the display 180 is almost completed and the rotation sensor 145 no longer outputs a low signal.

When it is detected that the output signal of the rotation sensor 145 maintains high for a longer time than the first time, the controller 170 may recognize that rotation of the display 180 is completed.

Accordingly, the controller 170 may stop rotation of the driver 160 and may end rotation of the display 180 (S119).

In summary, the controller 170 of the display device 100 according to an embodiment of the present disclosure may determine whether the output period of the low signal output by the light sensor 145 is changed, and when the output period of the low signal is changed, the controller 170 may control the display 180 to change the rotation speed of the display 180.

In addition, the memory 140 of the display device 100 according to an embodiment of the present disclosure may store an output period of a low signal output by the light sensor 145 and information of a rotation speed, etc. of the driver 160, suitable for output in response to the output period of the low signal output by the light sensor 145 according to the output period of the low signal output by the light sensor 145, a gear ratio and sizes of a driving gear 165 and a rotating gear 168, and the rotation speed, in response to the rotation speed of the driver 160.

Accordingly, the controller 170 of the display device 100 according to an embodiment of the present disclosure may perform control to change the speed of the driver 160 in response to the output period of the low signal stored in the memory 140.

Through the aforementioned embodiment, the display device 100 of the present disclosure may have an advantage of increasing accuracy in controlling the rotation speed of the display 180 and ensuring the stability of the product.

Figure 13:
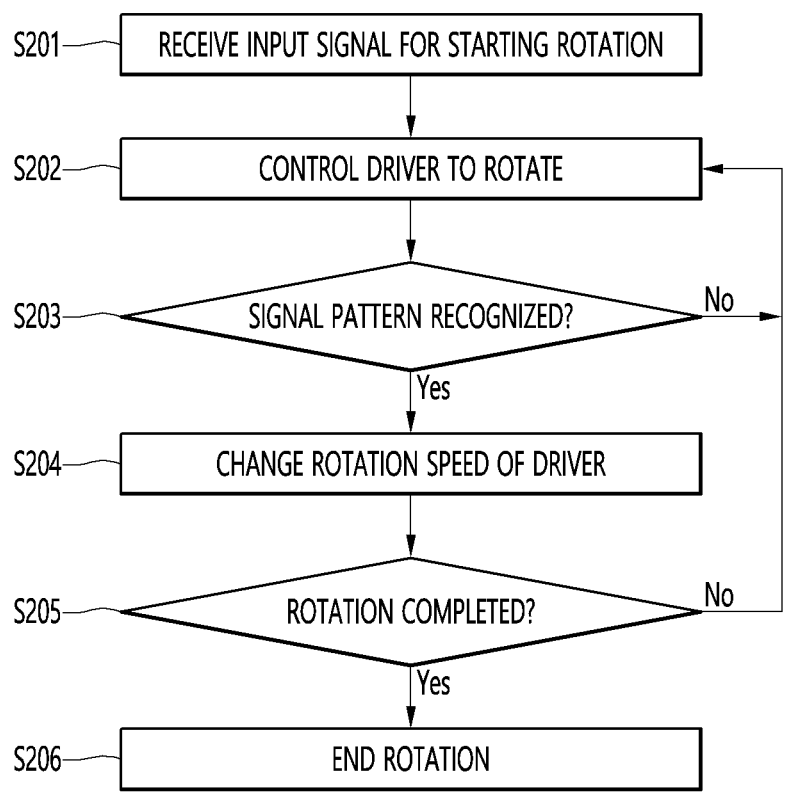
FIG. 13 is a flowchart briefly showing a method of controlling a rotation speed of a display based on an output signal of a rotation sensor by a display device.

FIG. 13 is a flowchart briefly showing a method of controlling a rotation speed of a display based on an output signal of a rotation sensor by a display device.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like. The computer may also include the controller 180 of the display device 100. Accordingly, the above detailed description should not be construed as restrictive in all respects but as exemplary. The scope of this specification should be determined by a reasonable interpretation of the appended claims, and all modifications within the equivalent scope of this specification are included in the scope of this specification.

The above description is merely illustrative of the technical idea of the present disclosure, and various modifications and variations may be possible without departing from the essential features of the present disclosure by those of ordinary skill in the art to which the present disclosure belongs.

Accordingly, the embodiments disclosed in the present disclosure are for explanation rather than limiting the technical spirit of the present disclosure, and the scope of the technical spirit of the present disclosure is not limited by these embodiments.

Each of the embodiments disclosed in this specification may be implemented alone as well as in combination with other embodiments.

The scope of the present disclosure should be interpreted by the following claims, and all technical ideas within the scope equivalent thereto should be construed as being included in the scope of the present disclosure.

The invention claimed is:

1. A display device comprising:
a motor;
a driving gear rotated by the motor;
a rotating gear engaged with the driving gear to rotate around a rotation axis and including a plurality of holes;
a display connected to the rotating gear to rotate around the rotation axis;
a rotation sensor configured to output a signal indicating whether a hole included in the rotating gear is detected; and
a processor configured to control the motor to change a rotation speed of the display based on the signal output by the rotation sensor,
wherein a saw tooth part for receiving rotational power from the driving gear is in a predetermined area of the rotating gear, and a hole part located adjacent to the rotation sensor to generate a rotation detection signal is in a remaining area of the rotating gear.

2. The display device of claim 1, wherein the rotation sensor includes a light sensor.

3. The display device of claim 1, wherein the plurality of holes included in the rotating gear include:
a plurality of first holes spaced apart from each other by a first distance in a rotation direction of the rotating gear; and
a plurality of second holes located after the plurality of first holes with respect to the rotation direction of the rotating gear and spaced apart from each other by a second distance different from the first distance.

4. The display device of claim 1, wherein the rotation sensor outputs a low signal indicating that the hole is detected, and
wherein the processor determines whether an output period of the low signal is changed.

5. The display device of claim 4, wherein, when the output period of the low signal is changed, the processor controls the motor to change the rotation speed of the display.

6. The display device of claim 4, wherein the processor controls the motor to change the rotation speed of the display in response to the output period of the low signal.

7. The display device of claim 6, further comprising:
a memory configured to store correspondence between the output period of the low signal and the display.

8. The display device of claim 1, wherein the processor recognizes whether rotation of the display is disturbed based on the signal output from the rotation sensor, and controls the motor to stop rotation when recognizing that the rotation of the display is disturbed.

9. The display device of claim 1, wherein the processor determines a rotation direction of the motor according to whether an input signal for starting rotation of the display is an input signal for changing an arrangement mode of the display to a landscape mode or an input signal for changing the arrangement mode to a portrait mode.

10. The display device of claim 1, wherein an arrangement mode of the display is changed to a landscape mode or a portrait mode according to a rotation direction of the driving gear.

* * * * *